UNITED STATES PATENT OFFICE.

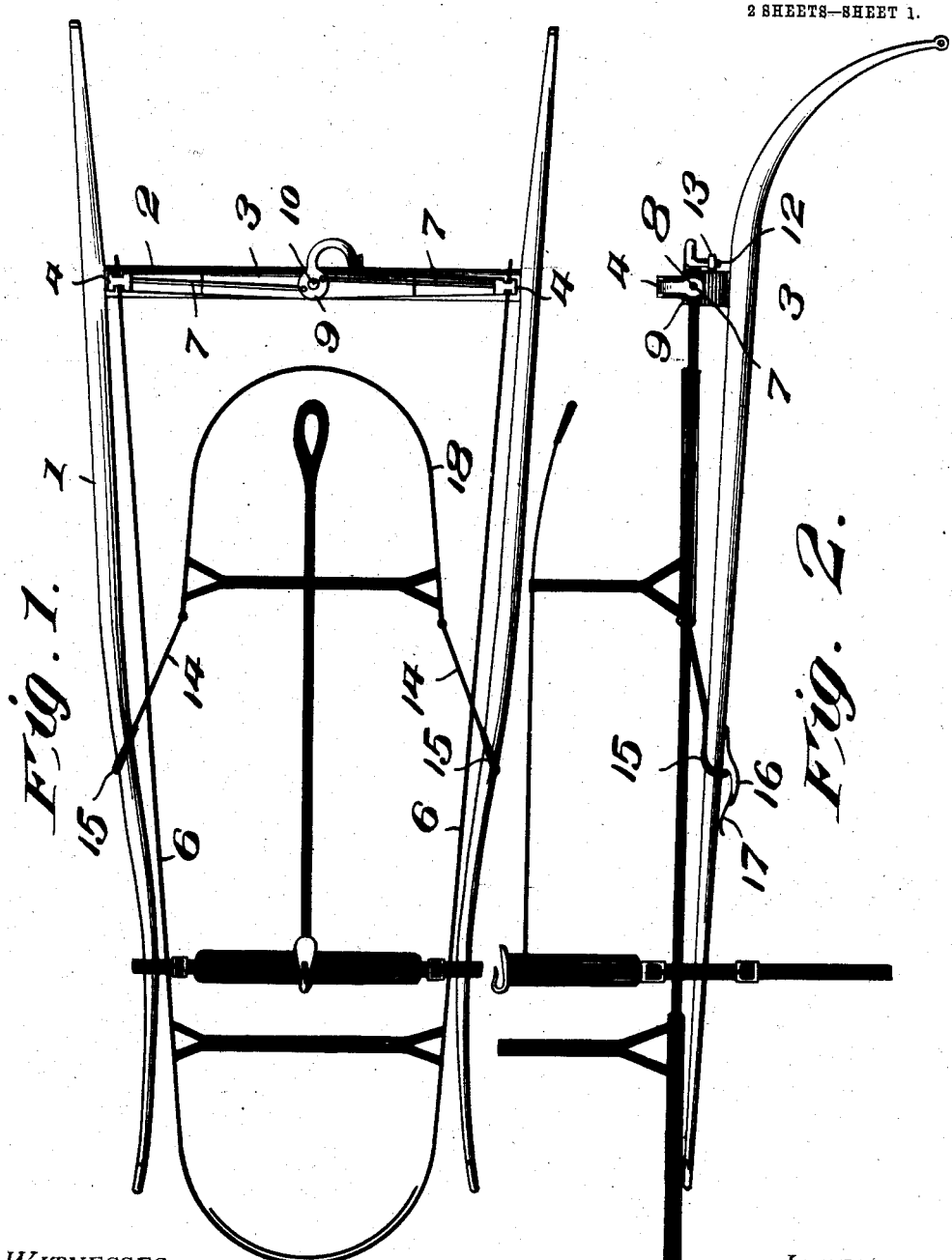

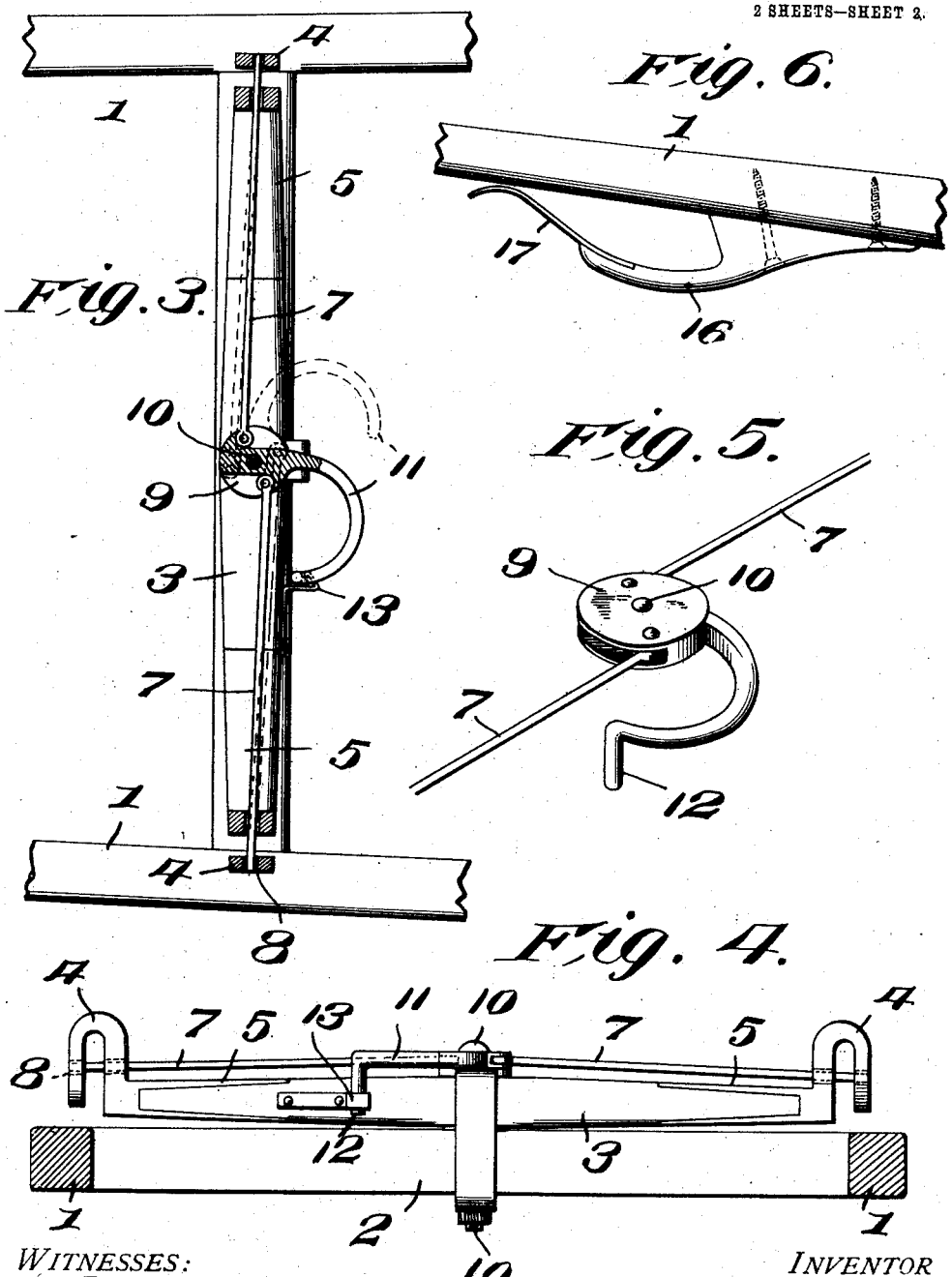

ISAAC HARSHMAN, OF LAPEL, INDIANA.

HORSE-RELEASING DEVICE.

No. 905,698.     Specification of Letters Patent.     Patented Dec. 1, 1908.

Application filed March 28, 1907, Serial No. 365,066. Renewed August 25, 1908. Serial No. 450,219.

*To all whom it may concern:*

Be it known that I, ISAAC HARSHMAN, a citizen of the United States, residing at Lapel, in the county of Madison and State of Indiana, have invented certain new and useful Improvements in Horse-Releasing Devices; and I do hereby declare the following to be a full, clear, and exact description of the invention, such as will enable others skilled in the art to which it appertains to make and use the same.

My invention relates to new and useful improvements in horse releasing devices for vehicles and my object is to provide means for instantaneously releasing the parts of the harness from the vehicle so that the horse can readily leave the shafts without any parts of the harness remaining attached thereto.

A further object is to provide means for holding the releasing device from casual operation.

Other objects and advantages will be hereinafter referred to and more particularly pointed out in the claim.

In the accompanying drawings which are made a part of this application, Figure 1 is a plan view of a pair of shafts showing my improved releasing device attached thereto and the manner of securing the harness to the shafts and swingle tree. Fig. 2 is a side elevation thereof. Fig. 3 is a detail plan view partly in section of my improved releasing device showing the same in its released position by dotted lines. Fig. 4 is a rear elevation thereof showing the shafts in section. Fig. 5 is a detail perspective view of a portion of the releasing mechanism, and, Fig. 6 is a detail side elevation of one of the shafts showing the manner of attaching parts of the harness thereto.

Referring to the drawings in which similar reference numerals designate corresponding parts throughout the several views, 1 indicates shafts such as are commonly employed in connection with vehicles, said shafts being provided with the usual form of reach bar 2 to which is secured my improved form of swingle tree 3. The swingle tree is provided at each end with a substantially U-shaped member 4 which are secured to the ends of the swingle tree by means of sockets 5 formed on one arm of the U-shaped member into which the ends of the swingle tree are inserted, the object of the U-shaped members being to receive the ends of the harness tugs 6 and in order to hold the tugs in engagement with the swingle tree, I direct rods 7 through alining openings 8 in the arms of the U-shaped member and through the usual eye formed in the end of the tug, the inner ends of said rods extending to the central portion of the swingle tree where they are pivotally secured to an eccentric 9, said eccentric being mounted upon a bolt 10 employed for securing the swingle tree to the reach bar.

The rods 7 are so secured to the eccentric that when the eccentric is partially rotated in one direction, the rods will be withdrawn from the openings 8 a sufficient distance to release the tugs from the swingle tree, the eccentric being provided with a curved arm 11 so that the eccentric may be readily operated and when the eccentric is in position to direct the rods through the openings 8 and the eye of the tugs it is held from casual rotation by means of a depending shank 12 which engages a spring actuated latch 13 secured to the rear face of the swingle tree.

In order to secure the back straps 14 to the shafts so that they will readily leave the shafts when the tugs are released and the animal moves forward, I provide loops 15 at the free ends of the back straps which extend over the ends of the shafts and are moved rearwardly on the shafts until they engage keepers 16 secured to the underside of the shafts, the free ends of said keepers being provided with spring fingers 17 which normally close the space between the ends of the keepers and the shafts so that when the loops are in engagement with the keepers, the spring fingers will hold the loops from casual removal from the keepers but will allow the loops to leave the keepers when a slight forward pull is given to the back straps.

In securing the animal to the shafts, the eccentric is rotated until the rods 7 are moved inwardly a sufficient distance to allow the tugs to be inserted between the arms of the U-shaped members after which the eccentric is returned to its initial position which will result in disposing the rods through the eyes in the tugs and the shank into engagement with the latch 13, after which the back straps which normally remain engaged with the shafts, are secured in the usual manner to the breeching 18 of the harness. By this construction it will be seen that when it is desired to release the animal from the vehicle as when the animal is running away, a pull upon the curved arm 11 will rotate the eccentric and release the tugs and as the animal moves forward the back straps will be pulled out of engagement with the keepers 16 and slide off the end of the shafts thereby completely releasing the animal from the shafts.

What I claim is:

The herein described releasing device comprising the combination with shafts having a reach bar, of a swingletree having stationary U-shaped members at its ends with registering openings, an eccentric rotatably mounted on the swingletree, rods pivotally connected with the eccentric upon diametrically opposite sides and in line with the pivot thereof and inclosed at their ends within the eccentric, the free ends of said rods working through the openings in said U-shaped members, a curved arm rigid with the eccentric and extended horizontally therefrom out of the plane of the swingletree and formed at its free end with a downwardly extended shank, and a spring latch on the swingletree to the rear thereof and with which said shank automatically engages to prevent casual rotation of the eccentric.

In testimony whereof I have signed my name to this specification in the presence of two subscribing witnesses.

ISAAC HARSHMAN.

Witnesses:
ROBERT CRITSER,
R. C. WRIGHT.